United States Patent [19]
Levine

[11] 4,316,452
[45] Feb. 23, 1982

[54] SOLAR COLLECTOR

[75] Inventor: Philip Levine, Bourne, Mass.

[73] Assignee: Thomassen U.S., Inc., Bourne, Mass.

[21] Appl. No.: 179,950

[22] Filed: Aug. 21, 1980

[51] Int. Cl.³ .............................................. F24J 3/00
[52] U.S. Cl. ................................. 126/450; 126/901; 126/429; 126/448
[58] Field of Search .............. 126/450, 432, 444, 445, 126/447, 446, 448, 429

[56] References Cited

U.S. PATENT DOCUMENTS

| | | | |
|---|---|---|---|
| 4,007,728 | 2/1977 | Guba | 126/445 |
| 4,130,108 | 12/1978 | Patil | 126/901 |
| 4,172,442 | 10/1979 | Boblitz | 126/450 |
| 4,222,373 | 9/1980 | Davis | 126/901 |

FOREIGN PATENT DOCUMENTS

| | | | |
|---|---|---|---|
| 2551832 | 4/1977 | Fed. Rep. of Germany | 126/901 |
| 2315671 | 2/1977 | France | 126/432 |

OTHER PUBLICATIONS

10/78 Sun Stone Brochure.
Solaron Brochure.
Sunworks Brochure.
Suncell Brochure.

*Primary Examiner*—Samuel Scott
*Assistant Examiner*—G. Anderson
*Attorney, Agent, or Firm*—Norman S. Blodgett; Gerry A. Blodgett

[57] ABSTRACT

Solar collector, using air as the flowing heated medium, including a glass enclosure, and using a thin metal diaphram in tightly-stressed condition as a heat absorbing agent.

22 Claims, 7 Drawing Figures

SOLAR COLLECTOR

BACKGROUND OF THE INVENTION

Most systems that are designed to gather heat from the rays of the sun include a solar collector, which is the unit which actually receives the sun's rays and converts them to a useful form. Most solar collectors use a flowing medium, such as air or other gas, or a liquid, such as water or some other inexpensive liquid, capable of retaining heat. In some cases, the rays of the sun operate directly on the flowing medium while in others, there are intermediate elements. The use of air has a number of advantages as the flowing medium for transferring heat from the solar collector to the place where it is to be used. Among other things, it does not freeze in the winter and it is readily transferred to one place to another by use of low energy fans and dampers. If handled properly and kept free of moisture, it does not corrode or deteriorate the elements through which it flows. If suffers, however, from a number of disabilities, one of which is its low capacity for absorbing heat. In other words, it takes large amounts of air flow through the solar collector to pick up sufficient heat to be practical. Therefore, there is a tendency in an air solar collector to allow a loss of flow or leakage for the reason that it does not seem to the designer to appreciably reduce the efficiency. In the solar collectors of the past that have used air there has been difficulty in concentrating the sun rays sufficiently to heat the air to a large amount during the limited resident time that it spends in the collector. These and other difficulties experienced with the prior art devices have been obviated in a novel manner by the present invention.

It is, therefore, an outstanding object of the invention to provide a solar collector which is capable of operating effectively either in very cold or very hot weather.

Another object of this invention is the provision of a solar collector making use of air as the flow medium in which leakage has been reduced to practical limits.

It is another object of the instant invention to provide a solar collector which is simple in construction, which is inexpensive to manufacture, and which is capable of a long life of useful service with a minimum of maintenance.

Another object of the invention is the provision of a solar collector, including an air-tight duct construction enclosed within an insulated outer enclosure of less expensive construction.

A still further object of the invention is the provision of a solar collector, using flowing air as the heat absorbent material, in which the elements are arranged to produce the greatest efficiency in transfer of the heat of the sun's rays to the outgoing air.

SUMMARY OF THE INVENTION

In general, the invention consists of a solar collector making use of a box-like rectangular frame adapted to be mounted facing the sun. The frame is formed of two spaced, parallel, insulated end walls and two spaced, parallel, insulated side walls. A glass enclosure is mounted in the frame adjacent the edges of the walls closest to the sun. A heat-absorbent sheet is mounted in the frame, spaced from and parallel to the glass enclosure. An air duct is mounted in a portion of the frame spaced away from the glass enclosure, the heat absorbent sheet forming at least part of a wall of the duct. A tension plate, forming part of the duct, lies in contact with the said sheet and is held in fixed connection therewith by clamping along their mutual edges.

More specifically, the tension plate is substantially thicker than the absorbent sheet and is formed of a material of higher thermal expansion than the sheet, so that the sheet is maintained under tension, irrespective of changes and temperature. The duct is provided with walls formed of highly heat-conductive material and the sheet is fastened to the duct in a heat conductive manner, so that the heat generated in the sheet is quickly carried into the walls of the duct for transfer to the air flowing through it.

The character of the invention, however, may be best understood by reference to one of its structural forms, as illustrated by the accompanying drawings, in which:

FIG. 1 is a perspective view of a series of solar collectors embodying the principles of the present invention shown in use on a residential building, FIG. 2 is a perspective schematic view of the solar collectors and associated equipment in the interior of the building, FIG. 3 is a perspective view of a solar collector with portions broken away to show details of the interior elements, FIG. 4 is a transverse sectional view of a portion of the solar collector taken on the line IV—IV of FIG. 3, FIG. 5 is a perspective view of two adjacent solar collectors showing the connection between them, FIG. 6 is a vertical side elevational view of a pair of solar collectors showing their connection and mounting, and FIG. 7 is a front elevational view of a series of solar collectors.

DESCRIPTION OF THE PREFERRED EMBODIMENT

Figure 1:
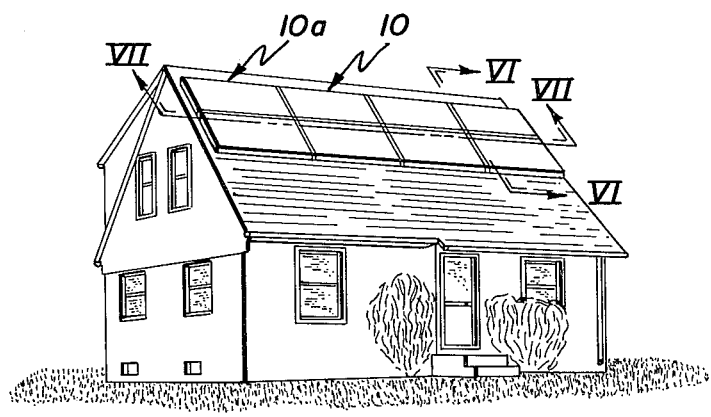

Referring first to FIG. 1, wherein are best shown the general features of the invention, a solar collector 10 is shown in use with a residential building. The solar collector and a number of similar collectors 10a, etc., are mounted on the roof of the building by brackets 29. In general, the collectors are mounted at such an angle that the sun's rays impinge upon them at a right angle during most of the year. As a practical matter, because of the different angle of inclination of the sun at different times of the year, it is necessary to work a compromise for this purpose.

Figure 2:
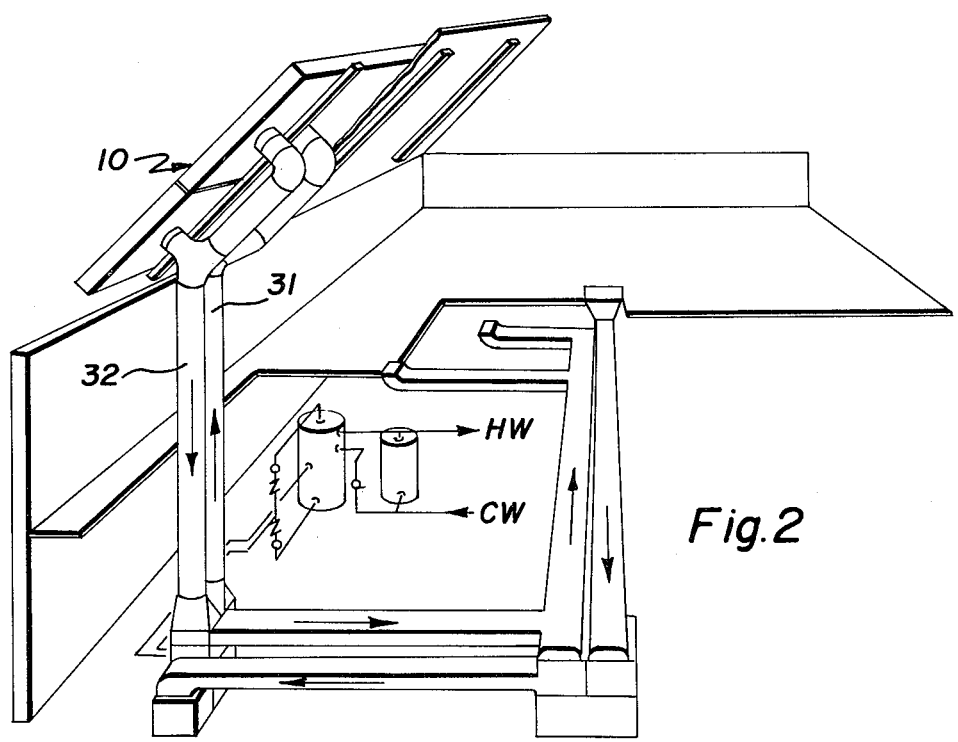

FIG. 2 shows the relationship of the solar collector 10 on the roof of the building with various elements within the building. An input air duct 31 leads into the solar collector while a output air duct 32 leads away from it and the two ducts are connected to suitable apparatus within the building for making use of the heated air. The heated air can be used for heating the building and warming water and in some cases the heat can be stored for later use.

Figure 3:
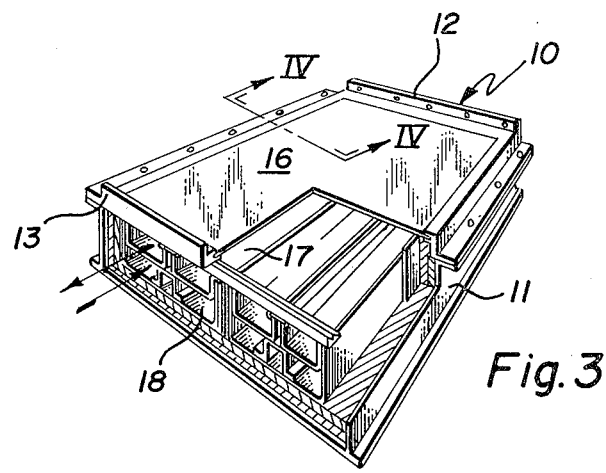
Figure 4:
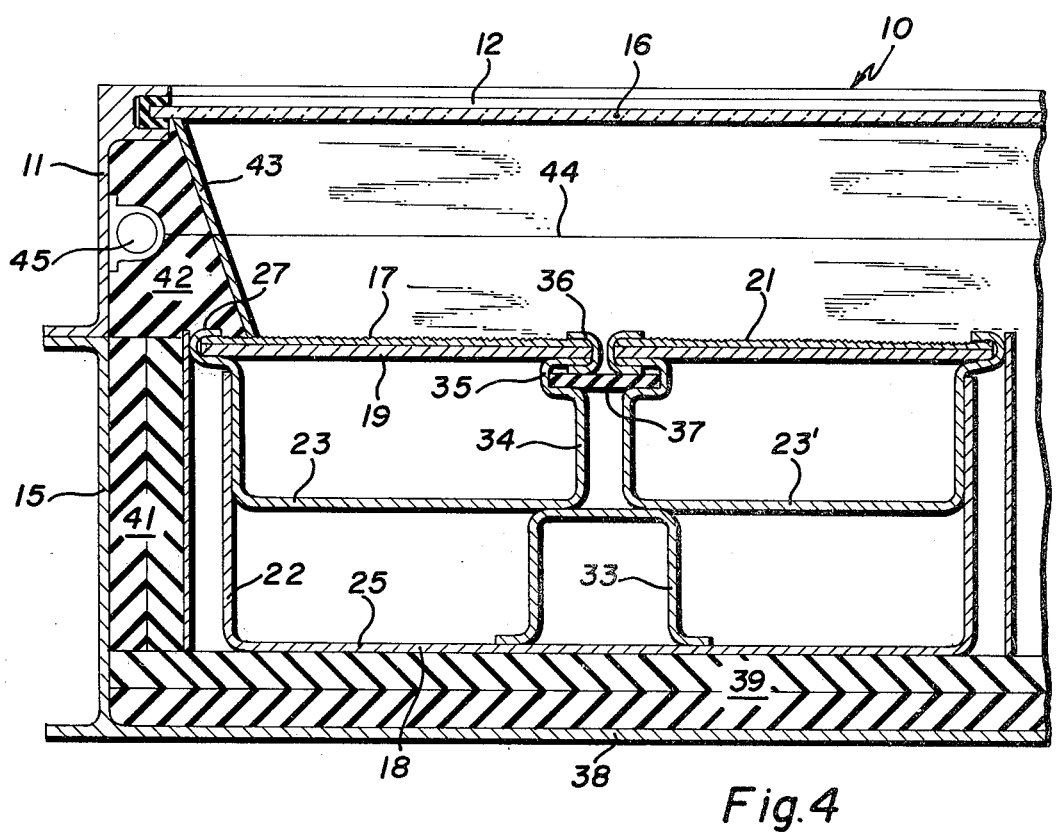
Figure 5:
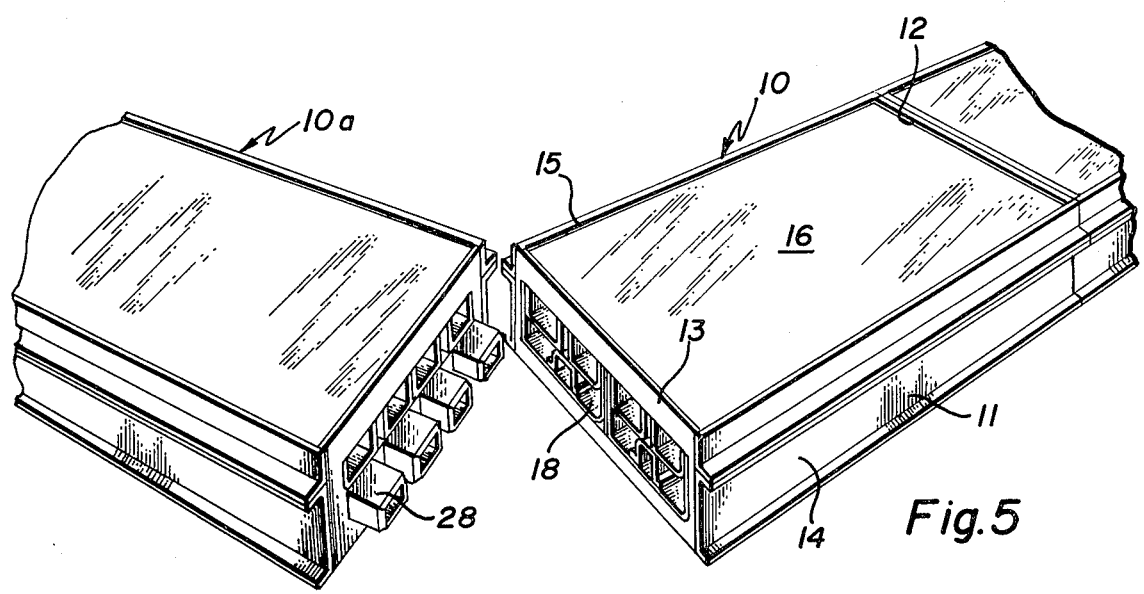
Figure 6:
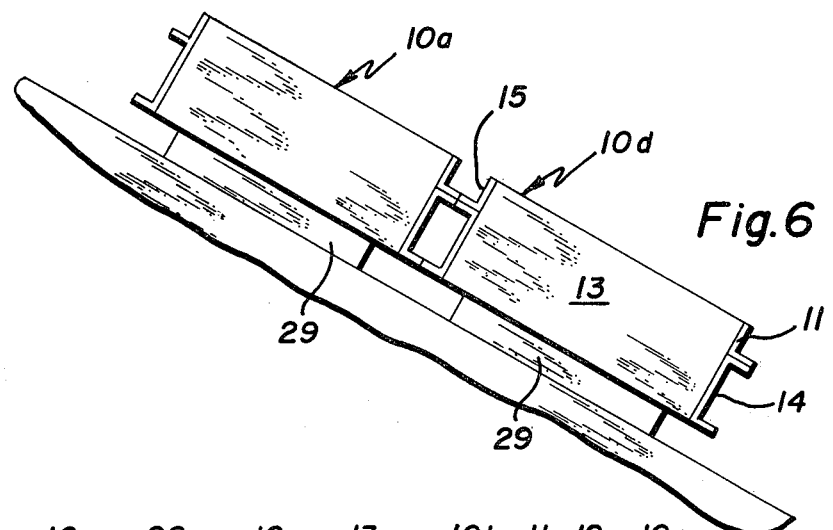

FIGS. 3 4 and 5 show the details of the solar collector 10. It is provided with a box-like rectangular frame 11 which is adapted to be mounted facing the sun. The frame is formed by two spaced, parallel, end members 12 and 13, by two spaced, parallel, side members 14 and 15. A glass enclosure 16 is mounted in the frame adjacent the edges of the frame members facing the sun. A heat absorbent sheet 17 is mounted in the frame and is spaced from and parallel to the glass enclosure 16. The sheet is located at a intermediate point between the edges facing the sun and the edges facing away. In the preferred embodiment, this sheet 17 is formed as a diaphram of very thin copper. The outer surface 21 of the copper sheet has been treated to provide it with dimples or roughness to promote turbulence in any air that passes over it. In addition it is provided with a coat of dull black paint to increase its absorbent qualities. A duct 18 is mounted in the frame in the portion thereof away from the glass enclosure and a tension plate 19 is mounted in the frame. In the preferred embodiment, the tension plate forms the top wall of the duct 18 and lies in contact with the absorbent sheet 17. The sheet and plate are held in contact with one another by clamping along their mutual edges.

The tension plate 19 is substantially thicker than the absorbent sheet 17, and is formed of a metal, such as aluminum, which has an index of thermal expansion that is slightly greater than the sheet copper. This way the absorbent sheet is maintained under tension at all times despite substantial variations in temperature.

The duct 18 is formed of sheets of a highly conductive material, such as aluminum, and the absorbent sheet 17 is fastened to the duct in a heat-conductive manner. In this way, any heat generated in the sheet is quickly carried into the walls of the duct and can be absorbed by the air carried in the duct, the heat transfer taking place by radiation, conduction, and convection.

The duct 18 is constructed in the form of two nested troughs 22 and 23 of generally rectantular cross-sectional shape. The inner trough 23 is the shallower of the two and has a bottom wall 24 spaced from and parallel to the bottom wall 25 of the outer trough 22. The absorbent sheet 17 extends between the upper edges of the inner trough 23. In the preferred embodiment, as is evident in FIG. 4, there are two inner troughs similar to the trough 23 and a tension plate and absorbent sheet is provided for each of these inner troughs. At one side of the trough 23, its edge is held in conductive relationship with the tension sheet 19 and the edge of the absorbent sheet 17 by folding the upper edge of the outer trough 23. The inner edge of the inner trough 23 is held together with the tension sheet and the absorbent sheet by a separate folded channel 36 of sheet metal.

Referring next to FIG. 5, it can be seen that a plurality of solar collectors 10 and 10a are joined together by use of a duct extension 28 on the solar collector 10a which is snugly received in the duct 18 at the end of the solar collector 10. When a plurality of solar collectors 10 are connected in series (as shown in FIG. 1), the end collectors are somewhat different in design. At one end they are provided with the inlet and outlet ducts 31 and 32, while the collector at the other end does not have the duct extension 28 but is provided with a closing plate and a reversing baffle.

Figure 7:
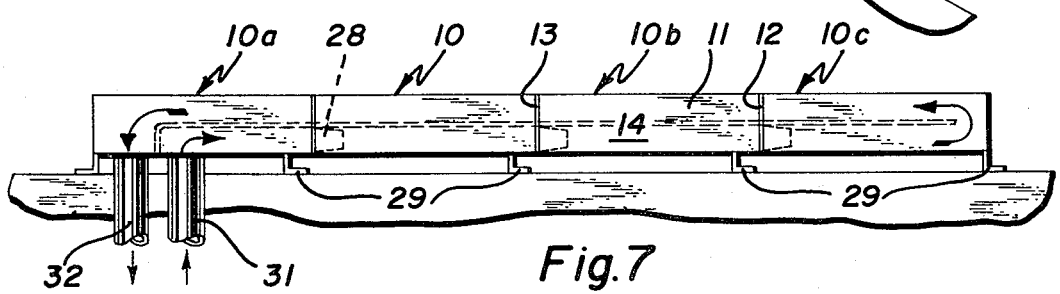

FIG. 7 shows how a series of solar collectors are placed end-to-end. It should be noted that the extreme right end duct is provided with a means for reversing the flow of air from the bottom portion of the duct to the top portion of the duct. In this drawing it can be seen that each solar collector is provided with one of the brackets 29 located adjacent the end that has the duct extension 28. As far as the intermediate solar collectors are concerned, the other end, that is to say the end not having the bracket, is supported by its next adjacent solar collector, because of the duct extension into it. In other words, a plurality of solar collectors are joined seriatim by means of a duct extension 28 protruding from one collector into snug, nesting relationship with the duct of the next adjacent collector. Each collector has a supporting bracket located only adjacent the end from which the duct extension protrudes.

Each duct is divided into two parts by a dividing wall, which in FIG. 4 is the bottom wall 28 of the trough 23. The inlet and outlet ducts 31 and 32 extend from the said parts of one end collector only (shown as 10a in FIG. 7). The other extreme end collector (shown as 10c in FIG. 7) is provided with a reversing means to direct air flow from one part to the other. Cool air is introduced into the duct part which is further from the glass enclosure and warm air is drawn from the duct part closer to the glass enclosure and to the absorbent sheet 17.

The operation and advantages of the invention will now be readily understood in view of the above description. When the solar collectors are arranged in the manner shown in FIGS. 1 and 2, cold air drawn from the interior of the residential building it passes through the collectors and returns into the building through the duct 32. While the air is in the building, it can be used for space heating or for heating water, the manner in which this is done being well known in the art. Referring to FIG. 4, the sun's rays impinge on the glass enclosure 16 and pass downwardly into the interior of the collector. The rays strike the pebbled surface 21 of the absorbent sheet 17 and the radiant energy is converted into thermal energy or heat. The heat in the sheet passes into the tension plate 19 which underlies it, and also passes end-wise through the folds 27 and 36 downwardly into the conductive material of which the troughs 22 and 23 making up the body of the duct are made. Cold air passes through the lower portion of the duct, i.e., between the bottom wall 25 of the trough 22 and the bottom wall 24 of the trough 23. The warm air, which has been reversed at the other end of the duct, proceeds through the portion of the duct defined by the bottom wall 24 of the trough 23 and the tension plate 19 which constitutes its cover.

As shown in FIG. 4, in the preferred embodiment the two upper troughs 23 and 23 are enclosed within the lower trough 22. The inner adjacent sides of the troughs 23 and 23 prime are fastened to and supported by a central bridge 33. The edge 27 wraps around the absorbent sheet 17 and the tension plate 19 and a similar construction is used at the other side of the trough 22. In the center, where the two troughs 23 and 23' come together, a different arrangement is used. The trough 23 construction is typical, its inner vertical wall 34 being bent inwardly at 35. The flange formed thereby is clamped to the sheet 17 and the plate 19 by a separate clamping strip 36. Between the bulge 35 of the wall 34 and the corresponding bulge in the trough 23' is a resilient seal strip 37.

In FIG. 4, it can also be seen that the frame 11 is provided with a bottom wall 38 with a body of insulation 39 lying between it and the bottom wall 25 of the trough 22. A body of insulation 41 is located between the side wall of the duct 18 and the side member 15 of the frame. Located above the duct and around the members of the frame 11 (between the sheet 17 and the glass enclosure 16) is located a generally trapezoidal-shaped body of insulation 42. An inclined surface of this body is provided with a layer 43 of reflective material 23 such as polished aluminum. The rays of the sun coming through the glass enclosure 16 impinge to some extent on this reflective sheet 43 and are reflected against the bottom surface of the glass enclosure so that it is directed back down onto the absorbent sheet 17, so that loss of radiant into the insulation is avoided.

It can be seen in FIG. 4 that it is possible to provide a high-temperature plastic film 44 with a low refractive index as a second cover to improve efficiency. Due to the large expansion and contraction of the plastic sheet, however, as the collector temperature changes, it must be tensioned to take up any slack. For that purpose, window-shade roller 45 of high-temperature construction with a torsional helical spring absorbs any slack developed by the plastic at high temperature. It also maintains a steady tension in the plastic. The use of the window-shade device maintains the correct air gap in the collector and avoids wrinkling of the plastic.

It can be seen, then, that the absorber sheet 17 is actually a foil membrane which is stretched across the top of the air duct. The sheet is mechanically captured by edge folds that allow flush joining to the adjacent ducts. Expansion strips or plates using metal with a thermal expansion coefficient slightly higher than that for the metal used in the absorber, keeps the absorber membrane taut as temperature increases. The seal strip 37 which fits into the slots formed by adjoining ducts serve to restrict leakage. The high-conductivity construction of the duct helps to conduct heat away from the absorber to the duct surfaces thus increasing heat transfer into the flowing air. The duct consists of a two-pass construction with cool air in the lower duct which increases conduction heat transfer from the absorber and eliminates the need for separate external return ducts.

The proportions of the collector spaces, as shown in FIG. 4, is exaggerated for the purpose of showing detail. Nevertheless, the air space is quite large to minimize free convection losses. The edge insulation 42 is provided to reduce the edge heat loss and reduce thermal agitation of the air in the space. A high-temperature gasket on the edges of the glass enclosure 16 insulates the interior metal edge from contact with dead air to restrict thermal agitation due to metal conduction. The reflective foil or sheet 43, which covers the edge, insulation serves to minimize the effects of edge shadows due to enlarged dead air space. The inclined slope of the sheet covering focuses the rays of the sun toward the center of the collector, allowing smaller and more efficient absorber. The installation of a plurality of collectors makes use of sliding overlap duct joiners or extensions 28 to prevent leadkage between two adjacent ducts carrying air in opposite directions. The duct extension is treated with a flexible sealent prior to joining, so that the inlet and the outlet air are manifolded by the inlet-outlet connection. Manifolding permits installation in long rows with a single inlet and a single outlet duct.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Solar collector, comprising;
  a box-like rectangular frame adapted to be mounted facing the sun, the frame being formed by two spaced parallel end members and two spaced parallel side members, all members having upper edges facing the sun,
  (b) a glass enclosure mounted in the frame adjacent the upper edges of the members,
  (c) a heat absorbent sheet mounted in the frame spaced from and parallel to the glass enclosure and located midway between the edges,
  (d) a duct mounted in the frame in a portion thereof away from the glass enclosure, the heat absorbent sheet forming at least part of a wall of the duct, and
  (e) a tension plate forming part of the duct and lying in contact with the said heat absorbent sheet and held in fixed connection therewith, the duct being in the form of two troughs of rectangular cross-section that are nested together and having upper edges, the bottom wall of one trough being spaced from and parallel to the bottom wall of the other trough, the sheet extending between the upper edges of the said other trough, these edges being bound together with the edges of the sheet in heat conductive relationship, the upper edges of the upper trough being folded over the corresponding upper edges of the other trough and the sheet to provide the said relationship.

2. Solar collector, comprising:
  (a) a box-like rectangular frame having an open top and being formed by a base, two spaced parallel end members and two spaced parallel side members,
  (b) a glass enclosure at the open top of the frame,
  (c) a duct mounted in the frame and spaced from the glass enclosure,
  (d) a tension plate forming the upper part of the duct, said tension plate being spaced from said glass enclosure,
  (e) a heat absorbing sheet covering the upper surface of the tension plate so that the sheet is spaced from and faces the glass enclosure, the side edges of said heat absorbing sheet being substantially aligned with the side edges of the tension plate, and
  (f) clamping means for fixing the side edges of the heat absorbing sheet to the side edges of the tension plate, the duct being in the form of an upper trough and a lower trough, each of said troughs having a bottom wall and being generally rectangular in cross-section, the bottom wall of the upper trough being spaced from and parallel to the bottom wall of the bottom trough, the sheet and tension plate forming a top wall for the upper trough.

3. Solar collector as recited in claim 2, wherein the upper trough is nested within the lower trough so that the bottom wall of the upper trough forms a top wall for the lower trough.

4. Solar collector as recited in claim 2, wherein the tension plate is substantially thicker than the said sheet and is formed of a material of higher thermal expansion than that of the sheet, so that the sheet is maintained under tension irrespective of changes in temperature.

5. Solar collector as recited in claim 2, wherein the sheet is formed of copper, is very thin, is provided with a pebbled surface, and is coated with a black paint.

6. Solar collector as recited in claim 2, wherein the duct is formed with walls formed of a highly heat conductive metal and the sheet is fastened to the duct in a heat conductive manner, so that heat generated in the sheet is quickly carried into the walls of the duct for transfer by convection, radiation, and conduction to air flowing through the duct.

7. Solar collector as recited in claim 2, wherein said upper trough includes a pair of side walls, the tops of said side walls being bent around the side edges of the tension plate and absorbing sheet to constitute said clamping means.

8. Solar collector as recited in claim 2, wherein two collectors are joined end-to-end by means of a duct extension protruding from one end of one collector and fitting snugly into the duct of the other collector.

9. Solar collector as recited in claim 8, wherein an attaching bracket is fastened to the collector adjacent the said one end for attaching the collector to a supporting structure.

10. Solar collector as recited in claim 2, wherein a plurality of collectors are joined seriatim by means of a duct extension protruding from one collector into snug nesting relationship with the duct of the next adjacent collector, each collector having one of said supporting brackets located adjacent the end of said solar collector from which the duct extension protrudes.

11. Solar apparatus as recited in claim 10, wherein each duct is divided into two parts by a dividing wall, wherein inlet and outlet ducts extending from the said parts of one end collector only, and wherein the other extreme end collector is provided with a reversing means to direct air flow from one part to the other.

12. Solar apparatus as recited in claim 11, wherein cool air is introduced into the duct part farther from the glass enclosure, and wherein warm air is drawn from the duct part closest to the glass enclosure.

13. Solar collector, comprising:
 (a) a box-like rectangular frame having an open top and being formed by a base, two spaced parallel end members and two spaced side members,
 (b) a glass enclosure at the open top of the frame,
 (c) a duct mounted in the frame and spaced from the glass enclosure,
 (d) a tension plate forming the upper part of the duct, said tension plate being spaced from said glass enclosure,
 (e) a heat absorbing sheet covering the upper surface of the tension plate so that the sheet is spaced from and faces the glass enclosure, the side edges of said heat absorbing sheet being substantially aligned with the side edges of the tension plate, wherein a plurality of collectors are joined seriatim by means of a duct extension protruding from one collector into snug nesting relationship with the duct of the next adjacent collector, each collector having one of said supporting brackets located adjacent the end of said solar collector from which the duct extension protrudes, and
 (f) clamping means for fixing the side edges of the heat absorbing sheet to the side edges of the tension plate, wherein each duct is divided into two parts by a dividing wall, wherein inlet and outlet ducts extending from the said parts of one end collector only, and wherein the other extreme end collector is provided with a reversing means to direct air flow from one part to the other.

14. Solar apparatus as recited in claim 13, wherein cool air is introduced into the duct part farther from the glass enclosure, and wherein warm air is drawn from the duct part closest to the glass enclosure.

15. Solar collector as recited in claim 13, wherein the tension plate is substantially thicker than the said sheet and is formed of a material of higher thermal expansion than that of the sheet, so that the sheet is maintained under tension irrespective of changes in temperature.

16. Solar collector as recited in claim 13, wherein the sheet is formed of copper, is very thin, is provided with a pebbled surface, and is coated with a black paint.

17. Solar collector as recited in claim 13, wherein the duct is formed with walls formed of a highly heat conductive metal and the sheet is fastened to the duct in a heat conductive manner, so that heat generated in the sheet is quickly carried into the walls of the duct for transfer by convection, radiation, and conduction to air flowing through the duct.

18. Solar collector as recited in claim 13, wherein the duct is in the form of an upper trough and a lower trough, each of said troughs having a bottom wall and being generally rectangular in cross-section, the bottom wall of the upper trough being spaced from and parallel to the bottom wall of the bottom trough, the sheet and tension plate forming a top wall for the upper trough.

19. Solar collector as recited in claim 18, wherein the upper trough is nested within the lower trough so that the bottom wall of the upper trough forms a top wall for the lower trough.

20. Solar collector as recited in claim 13, wherein said upper trough includes a pair of side walls, the tops of said side walls being bent around the side edges of the tension plate and absorbing sheet to constitute said clamping means.

21. Solar collector as recited in claim 13, wherein two collectors are joined end-to-end by means of a duct extension protruding from one end of one collector and fitting snugly into the duct of the other collector.

22. Solar collector as recited in claim 21, wherein an attaching bracket is fastened to the collector adjacent the said one end for attaching the collector to a supporting structure.

* * * * *